United States Patent
Ranedo Torres et al.

(10) Patent No.: US 12,002,639 B2
(45) Date of Patent: Jun. 4, 2024

(54) GAS SHUT-OFF SWITCH

(71) Applicant: ORMAZABAL Y CIA, S.L.U., Igorre (ES)

(72) Inventors: Luis Ranedo Torres, Igorre (ES); Juan Antonio Sanchez Ruiz, Igorre (ES)

(73) Assignee: ORMAZABAL Y CIA, S.L.U., Igorre (ES)

( * ) Notice: Subject to any disclaimer, the term of this patent is extended or adjusted under 35 U.S.C. 154(b) by 247 days.

(21) Appl. No.: 17/441,205

(22) PCT Filed: Apr. 22, 2020

(86) PCT No.: PCT/ES2020/070255
§ 371 (c)(1),
(2) Date: Sep. 20, 2021

(87) PCT Pub. No.: WO2020/216976
PCT Pub. Date: Oct. 29, 2020

(65) Prior Publication Data
US 2022/0157544 A1    May 19, 2022

(30) Foreign Application Priority Data
Apr. 26, 2019 (ES) .............. ES201930665U

(51) Int. Cl.
*H01H 33/88* (2006.01)
*H01H 33/70* (2006.01)
*H02B 13/035* (2006.01)

(52) U.S. Cl.
CPC ...... *H01H 33/886* (2013.01); *H01H 33/7084* (2013.01); *H02B 13/035* (2013.01)

(58) Field of Classification Search
CPC .. H01H 33/886; H01H 33/88; H01H 33/7084; H01H 33/56; H01H 33/7015;
(Continued)

(56) References Cited

U.S. PATENT DOCUMENTS 4,429,199 A * 1/1984 Pircher .............. H02B 13/0352
361/612
4,791,530 A * 12/1988 Kalvaitis .................. H02B 1/14
361/600
(Continued)

FOREIGN PATENT DOCUMENTS

EP  0199044 A2  10/1986
EP  0484747 A2   5/1992
(Continued)

OTHER PUBLICATIONS

Translation of EP0199044(Original document published Oct. 29, 1986) (Year: 1986).*
(Continued)

*Primary Examiner* — William A Bolton
(74) *Attorney, Agent, or Firm* — Wagenknecht IP Law Group PC

(57) ABSTRACT

Gas shut-off switch (1) provided with various operating positions and intended to be isolated in a dielectric gas inside an electrical switchgear cell (19) comprising at least one housing (2) with a pair of fixed contacts (3, 4) arranged diametrically opposed to each other and a movable contact (5) having a rotary motion to electrically connect said fixed contacts (3, 4); an arc chamber (6, 7) and an electric arc blowing means (8) jointly connected to the movable contact (5), wherein the arc chamber (6, 7) comprises a communication path (9, 10) with the exterior of the housing (2) that allows both the exit of the gases generated in the electric arc blowing and the entry of clean dielectric gas in said arc chamber (6, 7).

9 Claims, 3 Drawing Sheets

(58) Field of Classification Search
CPC .......... H01H 33/7046; H01H 33/7053; H01H 33/7069; H01H 33/90; H01H 33/182; H01H 9/443; H02B 13/035; H02B 13/045; H02B 13/075
USPC .... 218/1, 13, 22, 35, 45, 55, 59, 67, 79, 80, 218/99, 100, 134; 200/50.34, 50.39, 410, 200/243, 273
See application file for complete search history.

(56) References Cited

U.S. PATENT DOCUMENTS

| | | | | |
|---|---|---|---|---|
| 4,839,482 | A * | 6/1989 | Ackermann | H01H 33/7084 218/68 |
| 5,153,399 | A * | 10/1992 | Schaffer | H01H 33/886 218/63 |
| 5,483,416 | A * | 1/1996 | Goe, Jr. | H02B 11/24 361/600 |
| 5,841,087 | A * | 11/1998 | Fuchsle | H02B 13/035 218/78 |
| 6,271,493 | B1 * | 8/2001 | Ponsioen | H01H 1/52 218/55 |
| 6,504,125 | B2 * | 1/2003 | Nishitani | H02B 13/045 218/67 |
| 7,679,019 | B2 * | 3/2010 | Bodenstein | H02B 13/0354 218/7 |
| 7,728,247 | B2 * | 6/2010 | Pikkala | H01H 9/342 218/35 |

FOREIGN PATENT DOCUMENTS

| | | |
|---|---|---|
| EP | 2608240 A1 | 6/2013 |
| ES | 8801876 A1 | 5/1988 |
| ES | 2011445 B3 | 1/1990 |
| ES | 2066553 T3 | 3/1995 |
| ES | 2068699 T3 | 4/1995 |
| ES | 2534873 T3 | 4/2015 |

OTHER PUBLICATIONS

PCT/ES2020/070255 International Preliminary Report on Patentability mailed Feb. 25, 2021.

* cited by examiner

GAS SHUT-OFF SWITCH

CROSS REFERENCE TO RELATED APPLICATIONS

This is a US national phase application under 35 U.S.C. § 371 of international application no. PCT/ES2020/070255 filed 22 Apr. 2020, which claims priority to U201930665 filed in Spain on 26 Apr. 2019; the content of each is herein incorporated by reference in its entirety

TECHNICAL FIELD OF THE INVENTION

The invention deals with a gas shut-off switch, applicable in high-voltage electrical switchgear, such as in cells, wherein a gas or gas mixture is used as a means of extinguishing the electric arc and electrical insulation.

OBJECT OF THE INVENTION

The switch object of the invention, comprises a casing provided with at least an arc chamber inside which an electric arc can occur in the switch opening and closing, and wherein said electric arc is extinguished by the operation of a blowing means given its configuration and jointly connection with at least one movable contact of the switch, it allows blowing over the electric arc throughout the entire path of said mobile contact, as well as the regeneration of the dielectric medium in said arc chamber once the electric arc has been extinguished.

BACKGROUND OF THE INVENTION

Medium or high voltage electrical switches are sometimes installed inside electrical equipment, such as, for example, electrical switchgear cells, wherein said switches are incorporated in their proper compartment. In order to reduce the phase distance and thus achieve a compact enclosure and an insulating medium invariable to external or environmental conditions such as contamination or humidity, the switch compartment requires the use of an insulating medium, which can be either air or other gaseous medium, such as sulfur hexafluoride ($SF_6$), dry air, nitrogen, etc. Likewise, the same insulating medium, such as a dielectric gas of those mentioned above, in some cases also allows the extinction of the electric arc generated between the switch contacts in the opening and closing operations. As it is known, medium or high voltage electrical switches are intended to interrupt/cut the current that at a certain moment circulates through the line and can reach the interruption/cut-off value of the apparatus, occurring at the time of separation of the switch contacts an electric arc that can damage them. This is an undesired phenomenon that must be extinguished as soon as possible, since the arc can destroy the insulations and the contacts, as well as produce a sudden increase in temperature and pressure that can lead to explosions that may cause material damage, the formation of toxic gases or even injury to individuals. Therefore, the opening/cutting time is essential.

Another of the situations that can occur are closings against short circuits, that is, those cases in which, when closing the circuit, a fault is generated. In this case, there is an increase in the current that passes through the contacts, reaching several kA and also erosion occurs in the contacts due to the pre-arc.

In order to limit the wear of the contacts as much as possible, it is important that the switch opening is as fast as possible, so that the separation of the contacts is also carried out quickly. For this, the electrical switches use mechanical, hydraulic or electrical drives, as well as means of extinguishing the electric arc generated at the time of the switch opening, such as magnetic blowing systems, static arc cooling and lamination systems, vane gas blowing systems, piston blowing systems, detonation systems for explosive charges, ablation systems for a material that can emit a gas to help extinguishing the electric arc, etc.

The switch may be incorporated into a housing and this housing in turn may be mounted within an enclosure, being insulated in dielectric gas, of an electrical switchgear cell. In the mentioned vane gas blowing systems, the switch is associated with at least one vane that pushes the dielectric gas contained in the aforementioned housing, thus creating, in some cases, a gas current towards the electric arc, and in other cases turbulence of said gas inside the housing in order to extinguish the electric arc. The operation of said vane is associated with the movement of the switch contacts, as for example with the operation of the movable contact of the switch. In this way, in some cases, as for example in the case of contact switches with rotary movement, the vanes are associated with the driving axis of the movable contact, so that the operation of said movable contacts also causes the operation of the vanes.

In this sense, some examples of the state of the art can be cited, such as documents ES2534873T3, ES2068699T3, ES2011445B3 and ES2066553T3. All of these documents define gas blowing systems by vanes and in some of the documents this blowing by vanes is also combined with a magnetic blowing system to extinguish the electric arc generated between the switch contacts, specifically in the document ES2534873T3. In all these cited examples, the operation of the vanes is associated with the driving axis of the movable contact of the switch, this movable contact comprising a rotary movement and the switch comprising a housing in which the movable contact, the vanes and the fixed contact are incorporated, and wherein an electric arc is generated in the switch opening/closing. In a switch opening operation, due to the separation of the contacts, said electric arc is generated, and due to the movement of the movable contact, the vanes compress the dielectric gas inside the switch housing so that said gas exit through the spaces between the contacts and the vanes, thus blowing the electric arc in order to extinguish it.

Existing electric arc extinguishing systems by means of gas blowing by vanes, and specifically those defined in the cited examples of the state of the art, have the drawback that the housing that incorporates the switch and wherein the electric arc is generated is watertight, that is, the contaminated gases and the plasma generated during the switch operation are not evacuated and therefore accumulate inside said housing. Due to this, the mixture of gases with impurities that is inside the housing is detrimental to the next opening operation and can cause undesired consequences, such as a sudden increase in temperature and pressure that can lead to explosions causing material damage, the formation of toxic gases or even injury to individuals. Also, due to the fact that the switch housing is watertight, it is not possible to regenerate the gas contained therein, so the following operation could be adversely affected by not having a pure dielectric gas.

On the other hand, the most used dielectric gas in recent years is $SF_6$ gas due to its excellent dielectric properties and, among many other advantages, because it is not toxic to people. In this sense, the same state-of-the-art documents mentioned above, ES2534873T3, ES2068699T3, ES2011445B3 and ES2066553T3, which also use $SF_6$ as dielectric gas, can also be cited. However, this gas has a great environmental impact due to its high greenhouse effect potential (GWP=22800), which is why in recent years alternative gases have been sought that can replace this gas in this type of electrical switchgear.

The use of only more environmentally friendly gases as dielectric gas in this electrical switchgear would mean a considerable increase in the size of this equipment for a given voltage level, due to the lower dielectric strength of these gases compared to $SF_6$. Another option in this case would be to increase the filling pressure of the equipment to values higher than those used with $SF_6$ (around 1300 mbar), making the design for containers with pressures greater than 1500 mbar.

Some other examples of the state of the art are EP0199044 and EP0484747

SUMMARY OF THE INVENTION

The gas shut-off switch object of the present invention responds to the needs of the state of the art mentioned above, since it is designed to reduce the phase distance and thus achieve a compact enclosure and internal conditions invariable against external or environmental conditions such as contamination or humidity. Likewise, it is also prepared so that the gaseous dielectric medium can be pressurized at pressures above 1500 mbar and so that the same dielectric gas mentioned above allows the extinction of the electric arc generated between switch contacts in the opening and closing operations.

Thus, the gas shut-off switch of the invention is applicable in electrical power distribution networks and relates to a switch with various operating positions, such as a load shut-off switch, which can be installed inside electrical equipment, such as electrical switchgear cells, wherein said switch is integrated into its corresponding compartment and isolated in a gaseous dielectric medium, such as air, dry air, N2, O2, CO2, or gas mixtures such as fluoroketones with vector gases such as CO2, N2, O2, air, or mixtures thereof, or gas mixtures such as non-flammable hydrofluoroolefins with vector gases such as N2, O2, dry air, helium, CO2, or mixtures thereof, etc. More specifically, the gas shut-off switch of the invention comprises at least one housing, comprising inside said housing, or at least partially inside it, a pair of fixed contacts arranged diametrically opposed to each other and a movable contact having a rotary motion that can electrically connect the pair of fixed contacts to each other, and at least one arc chamber inside which an electric arc can occur in the switch opening and closing, the whole assembly being insulated in at least one dielectric gas inside of an electrical switchgear cell. It is also possible that at least partially a pair of fixed contacts and a movable contact that can be electrically connected to said fixed contacts are arranged inside the housing, thus being the switch a hinge type switch.

Preferably, according to the present invention, the switch comprises at least one electric arc blowing means, said blowing means being jointly connected to the movable contact, so that it performs the same movement path as the movable contact in the switch opening and closing. The movable contact can comprise at least two ends, each of said ends being able to electrically connect with each fixed contact and thus establish a closing position of the switch. Provision has also been made for the switch to comprise at least one grounding contact, the movable contact being able in this case to establish an electrical connection between a fixed contact and the grounding contact for the grounding operating position of the switch. Since the movable contact of the switch comprises two ends, the cut of the electric current occurs at two points, so that the energy of the generated electric arc is divided between two separate zones, the power of the electric arc to dissipate is also divided by said two points and therefore the extinction of the electric arc is facilitated. The blowing means is arranged at each of the ends of the movable contact, this blowing means consisting, for example, of a vane.

Each of said ends of the movable contact of the switch is located in each arc chamber comprising the switch housing, and said arc chambers comprise at least one communication path with the exterior of the housing, such as a grid, being said communication path permanently open for the exit of gases generated at the switch opening and for the entry of the clean dielectric gas contained inside the switchgear cell into the arc chambers once the switch opening operation has been completed. Therefore, in a switch opening operation, the blowing means is configured to compress the dielectric gas in a first portion of the arc chambers and force it to pass into a second portion of the arc chambers through spaces between the ends of the movable contacts and the fixed contacts, and through spaces between the blowing means and said contacts, so that the electric arc generated at the switch opening is blown by the dielectric gas throughout the entire path of the movable contact. At the same time, gases are evacuated from the second portion of the arc chambers to the exterior of the switch housing through the above-mentioned communication paths, such as grids. Once the switch opening is completed and the electric arc is extinguished, the pressures of the first portion and the second portion of the arc chambers stabilize, generating a flow of dielectric gas inverse to the electric arc blowing and thus regenerating the arc chambers with clean dielectric gas through the communication paths. In this way, the communication paths that comprise the arc chambers allow the evacuation of gases and plasma produced by the electric arc during the switch opening/closing, thus facilitating the evacuation of contaminated gas from the arc chambers, maintaining them free of contamination and with pure dielectric gas for the next switch operation.

The operation of the blowing means and the movable contact is associated with the operation of a rotation axis, to which both the blowing means and the movable contact are jointly connected.

The possibility that said rotation axis can be divided into three sections has been contemplated, so that each axis section comprises the movable contact and the blowing means, so that the corresponding three phases of the switch can be separated or assembled. The possibility that the movable contact, the blowing means and the rotation axis could form a solid piece that is configured as a single assembly has also been contemplated.

The gas shut-off switch is rotary and can consist of three operating positions and capable of closing against short-circuit.

DESCRIPTION OF THE DRAWINGS

In order to complement the description and help to obtain a better understanding of the features of the invention, according to a preferred example of practical embodiment thereof, a set of figures is included as an integral part of said description in which the following has been represented on an illustrative and not limiting basis.

DETAILED DESCRIPTION OF PREFERRED EMBODIMENT OF THE INVENTION

Figure 1:
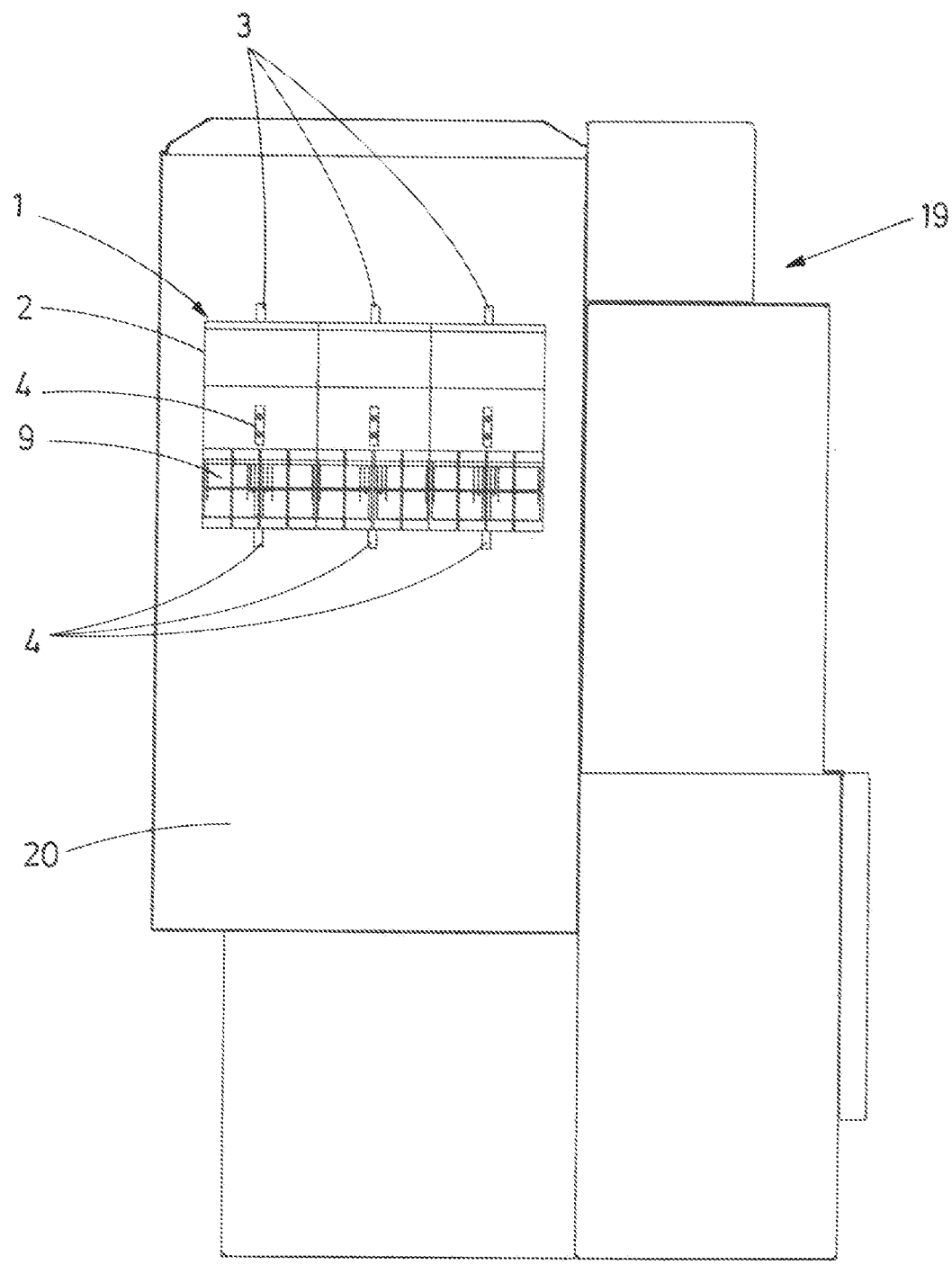
FIG. 1 is a side view of an electrical switchgear cell showing the arrangement of the gas shut-off switch of the invention within its corresponding compartment isolated in a dielectric gas.

As can be seen in FIG. 1, the gas shut-off switch (1) of the invention, such as a load shut-off switch, for example, is installed inside an electrical switchgear cell (19), which comprises several compartments, one of them being the compartment (20) wherein the gas shut-off switch (1) is located. This compartment (20) of the gas shut-off switch (1) is sealed and pressurized in a dielectric gas, such as, for example, air, dry air, N2, O2, CO2, or gas mixtures such as fluoroketones with vector gases such as CO2, N2, O2, air or mixtures thereof, or gas mixtures such as non-flammable hydrofluoroolefins with vector gases such as N2, O2, dry air, helium, CO2 or mixtures thereof, etc., so that it is possible to reduce the distance between phases, and consequently, more compact cells are obtained that minimize the problems of space in the facilities and transport. For this same purpose, the switch is also prepared so that the gaseous dielectric medium can be pressurized at pressures above 1500 mbar. Likewise, by means of gas insulation, a compact enclosure is achieved and inside it, an environment invariable to external or environmental conditions such as contamination or humidity.

Figure 2:
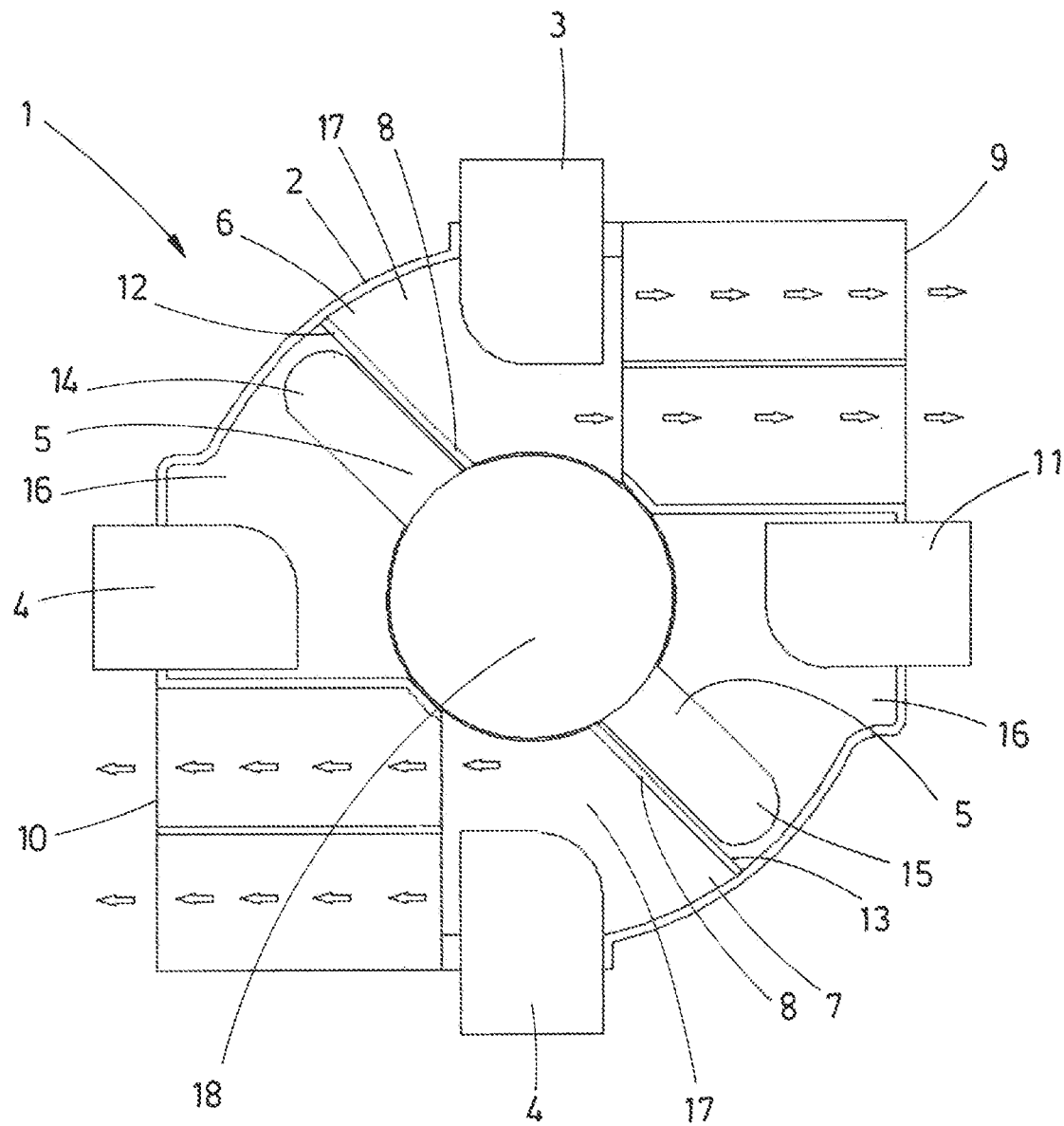
FIG. 2 is a sectional elevation view of the switch housing showing the arc chambers, the fixed contacts, the movable contact, the blowing means and the flow to the outside of the housing of the contaminated gas generated in the switch opening operation.
Figure 3:
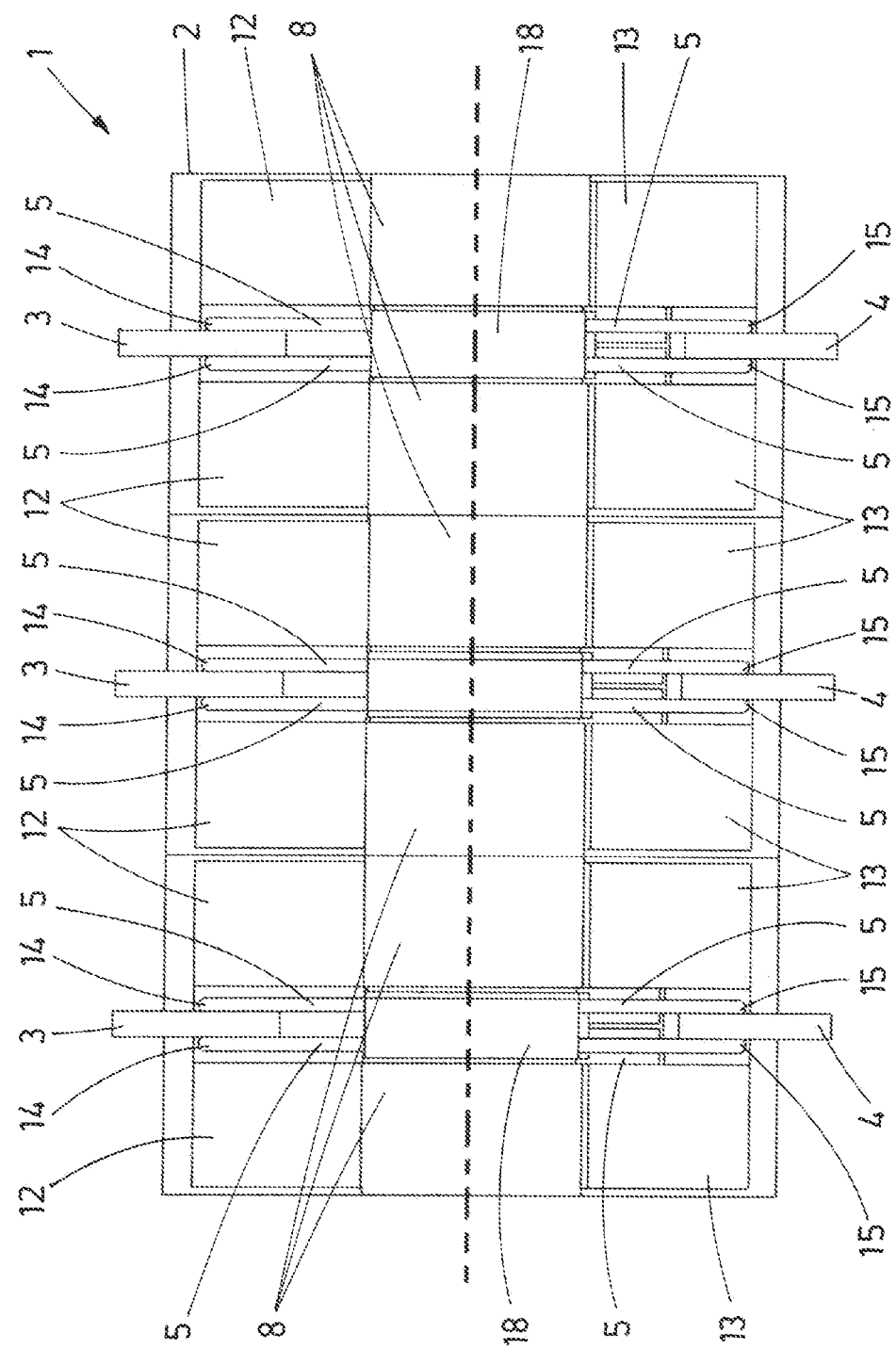
FIG. 3 is a sectional side view of the switch.

The gas shut-off switch (1), as shown in FIGS. 1, 2 and 3, comprises a housing (2) that incorporates inside, or at least partially inside, a pair of fixed contacts (3, 4) arranged diametrically opposite each other and a movable contact (5) having a rotary motion that can electrically connect the pair of fixed contacts (3, 4) to each other, and at least one arc chamber (6, 7) in which inside an electric arc can occur in the gas shut-off switch (1) opening and closing. As shown in FIG. 2, the gas shut-off switch (1) can consist of two or three operating positions, in the latter case comprising at least one ground contact (11) for the position of grounding operation, being able to perform connection, opening and grounding operations.

Inside the housing (2), specifically in the arc chambers (6, 7), there is provided the same dielectric gas that is available in the compartment (20) of the gas shut-off switch (1), so that said dielectric gas is used both for electrical insulation and for extinguishing electrical arcs. The housing (2) comprising the arc chambers (6, 7) can be structured in two parts, a first part that includes the arc chamber (6) and a second part that includes the arc chamber (7). The arc chamber (6) incorporates the fixed contact (3) and the arc chamber (7) incorporates the fixed contact (4), so that the electrical contact between the movable contact (5) and each of the fixed contacts (3, 4), as well as the separation between them occurs in different arc chambers, thus dividing the power of the electric arc to dissipate and facilitating the extinction of the electric arc.

Also, as shown in FIGS. 2 and 3, the gas shut-off switch (1) comprises at least one electric arc blowing means (8), such as for example vanes (12, 13), said blowing means (8) being jointly connected to the movable contact (5) so that it performs the same movement path as the movable contact (5) in the gas shut-off switch (1) opening and closing, which causes the electric arc to be blown at all times until it is extinguished. The movable contact (5) and the blowing means (8) jointly move around a rotation axis (18), so that the operation of the movable contact (5) due to the operation of said rotation axis (18) causes the blowing means (8) to also operate. The vanes (12, 13) can be arranged at each of the ends (14, 15) of the movable contact (5), as shown in FIGS. 2 and 3, along the ends (14, 15), projecting from said ends (14, 15) to the inner wall of the arc chambers (6, 7), and are configured to compress the dielectric gas in a first portion (16) of the arc chambers (6, 7) and forcing said compressed dielectric gas to pass through spaces between the ends (14, 15) of the movable contact (5) and the fixed contacts (3, 4), and through spaces between the vanes (12, 13) and said contacts (3, 4, 5) towards a second portion (17) of the arc chambers (6, 7) in the gas shut-off switch (1) opening for blowing the electric arc. Likewise, the arc chambers (6, 7) comprise at least one communication path (9, 10) with the exterior of the housing (2), said communication path (9, 10) being permanently open for the exit of gases generated in the gas shut-off switch (1) opening, as shown in FIG. 2, as well as for the entry into the arc chambers (6, 7) of the dielectric gas contained inside the electrical switchgear cell (19) once the gas shut-off switch (1) opening operation has been completed.

In the preferred embodiment of the invention, it has been provided that said communication paths (9, 10), such as grids (not shown in the figures), are included in the second portion (17) of the arc chambers (6, 7) between the inside and the outside of the housing (2). In this way, the contaminated gases generated in the gas shut-off switch (1) opening are evacuated to the exterior of the housing (2) through the communication paths (9, 10), and once the opening of the gas shut-off switch (1) takes place, the pressures of the first portion (16) and the second portion (17) of the arc chambers (6, 7) stabilize, generating a flow of the dielectric gas inverse to the electric arc blowing and thus regenerating the arc chambers (6, 7) with clean dielectric gas through the communication paths (9, 10), keeping them free of contamination and with pure dielectric gas for the next operation of the gas shut-off switch (1).

As can be seen in FIG. 3, the rotation axis (18) can be divided into three sections, so that each axis (18) section comprises the movable contact (5) and the blowing means (8), so that the three corresponding phases of the gas shut-off switch (1) can be separated or assembled. As another embodiment, it has also been provided that the movable contact (5), the blowing means (8) and the rotation axis (18) can form a solid piece that is configured as a single assembly.

As mentioned above, the gas shut-off switch (1) can be a rotary switch with three operating positions and with the ability to close against short circuits, that is, those cases in which when closing the circuit a fault is caused, being the switch capable of supporting the increase in current that passes through the contacts, and reaching several kA, in the closing operation.

What is claimed is:
1. A gas shut-off switch (1) provided with various operating positions and intended to be isolated in a dielectric gas inside an electrical switchgear cell (19) comprising at least one housing (2), said housing (2) being structured in two parts, which in turn comprises:

a first part that includes a first arc chamber (6) and a second part that includes a second arc chamber (7), where the first arc chamber (6) incorporates a first fixed contact (3) and the second arc chamber (7) incorporates a second fixed contact (4);

a movable contact (5) having a rotary motion to electrically connect with said fixed contacts (3, 4); and at least one electric arc blowing means (8);

characterized in that:

an electrical contact and separation between the movable contact (5) and each of the fixed contacts (3, 4) occurs in different arc chambers;

the blowing means (8) is jointly connected to the movable contact (5) to perform a same movement path as the movable contact (5) in the gas shut-off switch (1) opening and closing; and in that each of the first arc chamber (6) and the second arc chamber (7) comprises at least one communication path (9, 10) with an exterior of the housing (2) that allows both an exit of gases generated in an electric arc blowing and entry of clean dielectric gas in the first arc chamber (6) and the second arc chamber (7).

2. The gas shut-off switch (1) according to claim 1, characterized in that a pair fixed contacts (3, 4) are arranged diametrically opposite each other and the movable contact (5) can electrically connect the pair of fixed contacts (3, 4).

3. The gas shut-off switch (1) according to claim 2, characterized in that the gas shut-off switch (1) comprises at least one ground contact (11) for a ground operating position of the gas shut-off switch (1), so that said gas shut-off switch (1) comprises three operating positions, connection, opening and grounding.

4. The gas shut-off switch (1) according to claim 1, characterized in that the blowing means (8) of the gas shut-off switch (1) comprises at least one vane (12, 13) at each end (14, 15) of the movable contact (5), configured to compress the dielectric gas in a first portion (16) of the arc chambers (6, 7) and forcing said compressed dielectric gas to pass through spaces between the ends (14, 15) of the movable contact (5) and the fixed contacts (3, 4), and through spaces between two vanes (12, 13) and the movable contact (5) and the fixed contacts (3, 4) towards a second portion (17) of the first arc chamber (6) and the second arc chamber (7) in the gas shut-off switch (1) opening for the electric arc blowing.

5. The gas shut-off switch (1) according to claim 4, characterized in that the second portion (17) of the first arc chamber (6) and the second arc chamber (7) comprises communication paths (9, 10) between an inside and an outside of the housing (2).

6. The gas shut-off switch (1) according to claim 5, characterized in that the communication paths (9, 10) comprise a gas cooling grid.

7. The gas shut-off switch (1) according to claim 4, characterized in that the movable contact (5) and the blowing means (8) jointly move around a rotation axis (18).

8. The gas shut-off switch (1) according to claim 7, characterized in that the rotation axis (18) is divided into three sections, so that each section of axis (18) comprises the movable contact (5) and the blowing means (8), so that three corresponding phases of the gas shut-off switch (1) can be separated or assembled.

9. The gas shut-off switch (1) according to claim 7, characterized in that the movable contact (5), the blowing means (8) and the rotation axis (18) form a solid piece that is configured as a single assembly.

* * * * *